US012186936B2

(12) United States Patent
Vasconcelos et al.

(10) Patent No.: US 12,186,936 B2
(45) Date of Patent: Jan. 7, 2025

(54) SYSTEM FOR DEMOLDING MATERIALS OBTAINED BY MEANS OF THE FREEZE-CASTING TECHNIQUE

(71) Applicants: Petróleo Brasileiro S.A.—Petrobras, Rio de Janeiro (BR); UNIVERSIDADE FEDERAL DE MINAS GERAIS—UFMG, Belo Horizonte (BR)

(72) Inventors: Wander Luiz Vasconcelos, Nova Lima (BR); Alan Marcos Da Silva Reis, Nova Lima (BR); Jailton Ferreira Do Nascimento, Rio de Janeiro (BR); Priscila Cristh Fonseca Alves, Belo Horizonte (BR); Daniela Cordeiro Leite Vasconcelos, Nova Lima (BR); Débora Guimarães Da Silva, Belo Horizonte (BR)

(73) Assignees: Petróleo Brasileiro S.A.—Petrobras, Rio de Janeiro (BR); UNIVERSIDADE FEDERAL DE MINAS GERAIS—UFMG, Belo Horizonte (BR)

( * ) Notice: Subject to any disclaimer, the term of this patent is extended or adjusted under 35 U.S.C. 154(b) by 0 days.

(21) Appl. No.: 17/901,114

(22) Filed: Sep. 1, 2022

(65) Prior Publication Data

US 2023/0065581 A1 Mar. 2, 2023

(51) Int. Cl.
*B28B 7/12* (2006.01)
*B28B 1/00* (2006.01)

(52) U.S. Cl.
CPC ................ *B28B 7/12* (2013.01); *B28B 1/007* (2013.01)

(58) Field of Classification Search
CPC .. B28B 7/10; B28B 7/12; B28B 13/06; B28B 2007/00; B28B 13/04; B28B 3/2609; B28B 1/90; B29C 39/36

(Continued)

(56) References Cited

U.S. PATENT DOCUMENTS 3,310,276 A * 3/1967 Bonney ................. B29C 33/305 249/219.1
4,971,612 A * 11/1990 Loughran ............... F01N 1/082 181/258

(Continued)

FOREIGN PATENT DOCUMENTS

BR 102018010463 A2 12/2019
CN 1473696 A 2/2004

(Continued)

OTHER PUBLICATIONS

Machine English translation of Dong et al. (CN-204699591-U) (Year: 2015).*

(Continued)

*Primary Examiner* — Jeffrey M Wollschlager
*Assistant Examiner* — EdgaredManuel Troche
(74) *Attorney, Agent, or Firm* — Mintz, Levin, Cohn, Ferris, Glovsky and Popeo, P.C.

(57) ABSTRACT

A linear actuator is used to remove solid-state parts in low-temperature condition from the containers used as a mold for manufacturing parts using freeze-casting. The device allows pressure to be applied to the material to be removed, resulting in ejection. The displacement of the material is performed with controlled displacement speed, providing the achievement of defect-free materials. The system performing the ejection includes a source of compressed air, a pressure regulator filter coupled with a manometer, a directional valve, the linear actuator, a baton, (Continued)

a flow regulating valve, a fastening means, a metallic support and a chamber for receiving the cooled material.

32 Claims, 9 Drawing Sheets

(58) Field of Classification Search
USPC ........................................................ 425/436 R
See application file for complete search history.

(56) References Cited

U.S. PATENT DOCUMENTS

| | | | | |
|---|---|---|---|---|
| 2010/0028477 | A1* | 2/2010 | Ryu | A61C 13/081 425/149 |
| 2019/0358852 | A1* | 11/2019 | Grava | B28B 1/007 |

FOREIGN PATENT DOCUMENTS

| | | | | | |
|---|---|---|---|---|---|
| CN | 201268078 | Y | | 7/2009 | |
| CN | 204699591 | U | * | 10/2015 | |
| CN | 108621294 | A | * | 10/2018 | B28B 13/06 |
| CN | 108638288 | A | * | 10/2018 | B28B 1/001 |
| CN | 108621294 | B | * | 12/2019 | B28B 13/06 |
| DE | 112007001745 | T5 | * | 6/2009 | A61C 13/081 |
| JP | 3002012 | B2 | * | 1/2000 | |
| WO | WO-9910156 | A1 | * | 3/1999 | A41D 27/08 |

OTHER PUBLICATIONS

Non Patent Literature of Grainger ("Speedaire® Large Bore Aluminum Air Cylinders"; Grainger "NPL1_LinearActuator_AirCylinder_Ops_and_Parts_Manual_2008.pdf" (Year: 2008).*
Non Patent Literature Nex Flow Air Products Corp. "NPL_Pneumatics vs Hydraulics _ What is the difference.pdf" (Year: 2021).*
Non Patent Literature "DelTron_NPL_The 4 Types of Linear Actuators.pdf" (Year: 2021).*
Non Patent Literature of Ensigner ("Glass filled polyamide," 2021). https://www.ensingerplastics.com/en-us/shapes/modified-plastics-/glass-filled-polyamides (Year: 2021).*
Non Patent Literature of StopLossBag (2016). https://kiltedcraftworks.com/2016/04/05/stop-loss-bag-jig/#jp-carousel-2159 (Year: 2016).*
Non Patent Literature of Automation Direct, "What is a Pneumatic System?"; https://library.automationdirect.com/pneumatic-system/ (Year: 2020).*
NPL_FABCO_Air (2014) https://web.archive.org/web/20141111150641/https://fabco-air.com/pdf/MP_press.pdf (Year: 2014).*
Machine English translation of Li et al. (CN-108621294-A1, equivalent to CN-108621294-A and CN-108621294-B). (Year: 2018).*
Deville, Sylvain (Sep. 14, 2013) "Ice-templating, Freeze Casting: Beyond Materials Processing", Journal of Materials Research, 28(17):2202-2219.
Liu et al. (Nov. 2015) "A Review of Manufacturing Strategies and Applications of Porous Ceramics Prepared by Freeze-casting Method", Ceramics International, 42(2):2907-2925.
Scotti et al. (May 2018) "Freeze Casting—A Review of Processing, Microstructure and Properties via the Open Data Repository", Progress in Materials Science, 94(12):243-305.

* cited by examiner

SYSTEM FOR DEMOLDING MATERIALS OBTAINED BY MEANS OF THE FREEZE-CASTING TECHNIQUE

CROSS-REFERENCE TO RELATED APPLICATION

This application claims priority to Brazilian Application No. 10 2021 017434 0 filed on Sep. 1, 2021, and entitled "SYSTEM FOR DEMOLDING MATERIALS OBTAINED BY MEANS OF THE FREEZE-CASTING TECHNIQUE," the disclosure of which is incorporated herein by reference in its entirety.

FIELD OF THE INVENTION

The present invention is based on the development of an apparatus for demolding materials produced by means of the processing technique called freeze-casting.

DESCRIPTION OF THE STATE OF THE ART

The processing method called freeze-casting consists of a technique that allows the manufacturing of materials with a large volume of pores (>50%) that are ordered hierarchically. Also referred to by the designations: "ice templating" or "unidirectional freezing", this technology consists of the application of a temperature gradient in a (aqueous or not) liquid solution placed in a mold, to promote the solidification of the solvent present in a suspension. During the freezing of the mixture, walls are created due to the growth of solvent crystals (freezing front) and subsequent rejection of solid particles. At the end of this step, the material obtained is taken to a step of sublimation of the frozen solvent. The remaining pore structure becomes a replica of the crystal morphology of the solidified fluid (Deville, S. *Ice-templating, freeze casting: Beyond materials processing, Journal of Materials Research*, vol. 28, n. 17, 2013).

The flexibility of the freeze-casting process is another advantage of the technique, since the volumetric fraction, size, shape and orientation of the porosity during the process can be controlled by changing the characteristics of the suspension such as the type of fluid, additives, concentration and particle size as well as the solidification conditions and technique, freezing temperature, mold design and freezing substrate (Liu et al., *A review of manufacturing strategies and applications of porous ceramics prepared by freeze-casting method, Ceramic International*, vol. 42, 2907-2925, 2016).

In addition to the benefits mentioned, it is worth to emphasize that freeze-casting is a processing method that occurs in rapid manufacturing cycles for each part, the solvent removal methodology does not result in the formation of cracks in the material and the elimination of binders do not damage the material structure. Due to the versatility of the technology, a wide spectrum of raw materials can be used in freeze-casting processing, such as ceramic, metallic, polymeric and composite materials. In turn, the materials obtained by means of this technique can be applied in a wide range of applications, such as substrates for supercapacitors, liquid chromatography, pressure, biological and gas sensors, batteries, biomaterials, pharmaceutical and food products, among others (Scotti and Dunand, Freeze casting—*A review of processing, microstructure and properties via the open data repository, Progress in Materials Science*, vol. 94, 243-305, 2018).

However, there is an inconvenience in the freeze-casting process, it presents a great difficulty regarding the extraction of the produced part from the mold where it was manufactured.

Document BR102018010463A2 discloses a demolding system for ceramic pieces manufactured by freeze-casting comprising a mold comprising an upper opening and a lower opening, wherein the upper opening is adapted to receive a colloidal suspension, and one of the openings is adapted to allow the passage of a piece made of ceramic, where the system comprises at least one main demolding element adapted to drive a piece made of ceramic through an opening in the mold.

Document CN201268078Y discloses a utility model that provides a compressed air demolding system of a thin wall and deep cavity mold, comprising an air source, an air channel, an air pin, an air inlet, a valve, a quick connector, a static mold and a mobile mold.

Document CN1473696A discloses a method for extracting the mold by compressed air after the injection molding process, where after the injection and separation of the mobile mold from the static mold, compressed air is conducted to the connecting part between the top of the mold core and the product to be ejected.

In view of the difficulties present in the state of the art mentioned above, and for solutions where the demolding of materials obtained by means of the freeze-casting technique is necessary, there is a need to develop a technology capable of performing effectively and that is in accordance with environmental and safety guidelines. The state of the art mentioned above does not have the unique features that will be presented in detail below.

OBJECTIVE OF THE INVENTION

The present invention aims at providing a pneumatic device for demolding with controlled speed of materials obtained by means of the freeze-casting technique that are in the configuration of discs, monoliths, billets, bars or hollow tubes, encompassing different dimensions.

BRIEF DESCRIPTION OF THE INVENTION

The present invention proposes an apparatus for demolding materials produced by means of the processing technique called freeze-casting. More specifically, it addresses to the application of a linear actuator to perform the sliding/extraction of solid-state parts in low-temperature condition from the containers used as a mold for manufacturing parts using freeze-casting. The device allows pressure to be applied to the material to be removed, resulting in ejection. The artifact further allows the displacement of the element with controlled displacement speed, providing the achievement of defect-free materials.

A system for demolding materials obtained by means of the freeze-casting technique characterized in that it comprises a source of compressed air (1), a pressure regulator filter (2) coupled with a manometer (3), a directional valve (4), a linear actuator (5), a baton (6), a flow regulating valve (7), a fastening means (8), a metallic support (9) and a chamber for receiving the cooled material (10).

BRIEF DESCRIPTION OF DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will be clear to one skilled in the art, from reading this description, possible further embodiments of the present invention still comprised by the essential and optional features below.

Figure 1:
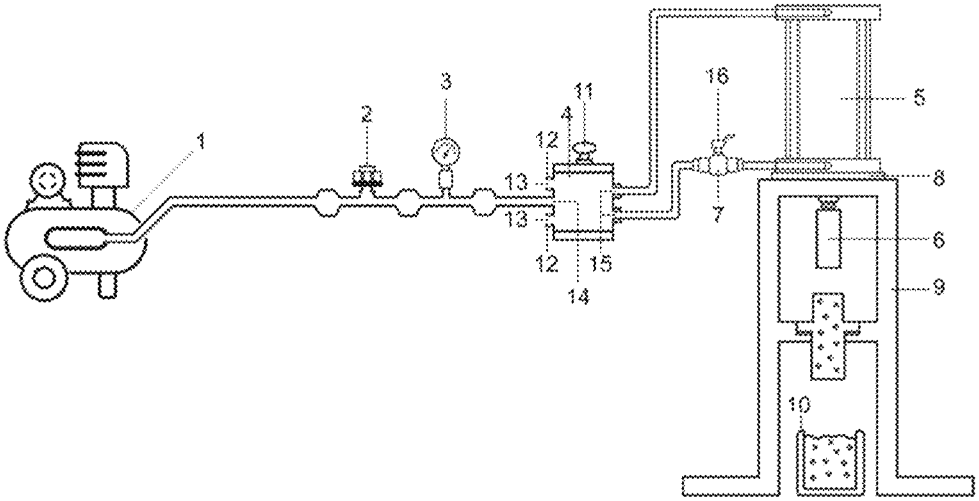
FIG. 1 illustrates a schematic representation of the proposed demolding apparatus.

FIG. 1 schematically illustrates the devices that make up the demolding system for materials manufactured by freeze-casting. In a simplified way, the demolding apparatus consists of a source of compressed air (1), a pressure regulator filter (2) coupled with a manometer (3), a pneumatic directional valve (4), a linear actuator (5), a baton (6), a flow regulating valve (7), a fastening means (8), a metallic support (9) and a chamber for receiving the cooled material (10).

Figure 2A:
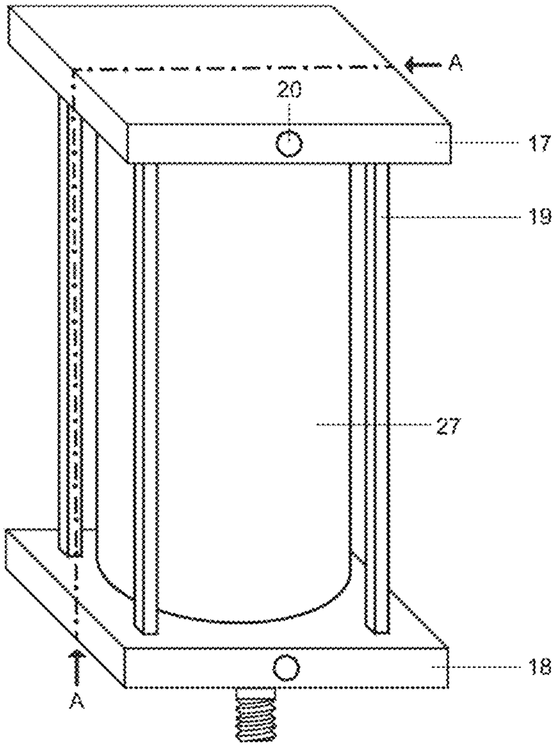
FIG. 2*a* illustrates a perspective view of the linear actuator (5).
Figure 2B:
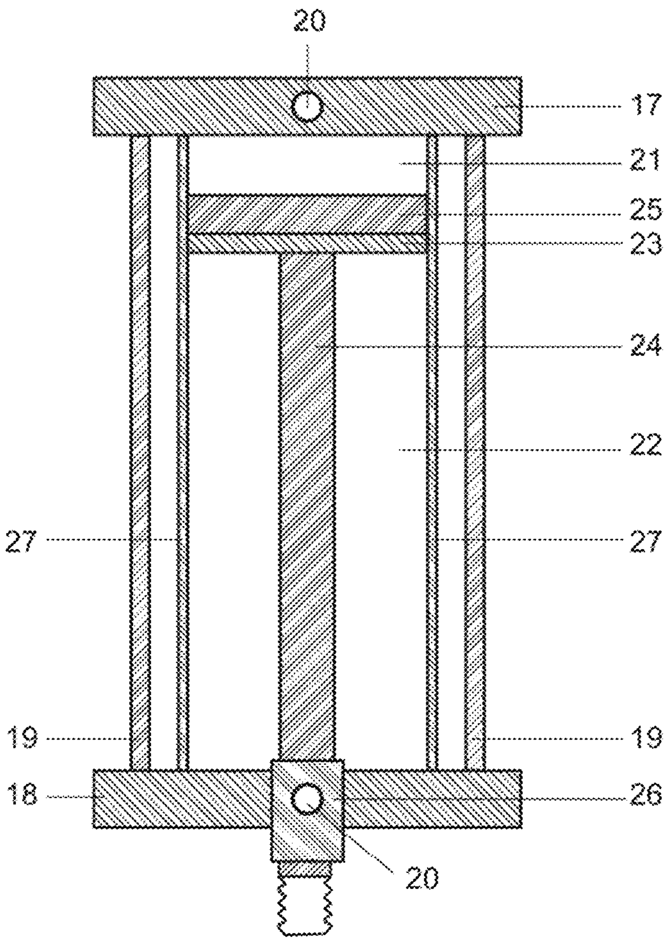
FIG. 2*b* illustrates the AA section indicated in FIG. 2*a*.

The linear actuator (5) is a device capable of providing movements in a linear trajectory, so it can be applied in situations that require the action of tilting, lifting, pulling or pushing a load. The linear actuator used in this assembly, according to the perspective illustrated in FIG. 2*a*, is pneumatic in nature and is not limited to this operating principle, allowing, for example, the use of mechanical, hydraulic or electromechanical devices. The linear actuator, according to the AA section shown in FIG. 2*b*, can consist of two heads, one front (17) and one rear (18) and four tie rods (19) that provide support to the set. In the heads, there are holes (20) that allow the connection of a hose to carried compressed air and access to the upper (21) and lower (22) chambers. Compressed air filling in the chambers promotes the upward and downward movement of the piston (23). The sealing is done by positioning a set of sealing rings (25) on the piston. The metal rod (24) is coupled to the piston and, in a similar way, moves as a function of the accumulation/emptying of pressurized air in the chambers. A fastened support for the moving rod is provided by a bearing (26), which is positioned at the outlet of the lower chamber. The entire system is surrounded by a skirt (27) of anodized aluminum, not limited to this material, to provide protection to the operating system in general.

In this apparatus, the compressor (1) converts energy, with the aid of a motor, into stored potential energy (pressurized air). When released from the compressor, the compressed air is sent to a pneumatic pressure regulating filter (2) coupled with a manometer (3). The pressure regulator filter (2) is provided with a valve that opens and closes in order to regulate the outlet pressure. With the aid of the manometer (3) it is possible to check the pressure of the compressed air being fed into the pneumatic directional valve (4). The pneumatic directional valve can be optionally a 5/2-way model, not limited. The 5/2-way valve has five ports, one for inlet (14), two for exhaust (13) and two for work (15). An actuator for intervention in the advance or withdrawal of the piston (23) is installed in the directional valve, optionally being allowed the use of a driving button with lock (11). When compressed air is allowed to enter the linear actuator, the upper chamber (21) of the cylinder is filled, thus generating a pressure difference between the interior of the upper chamber and atmospheric pressure, promoting energy accumulation. The filling of the upper chamber forces the wall of the piston (23), causing it to move, causing the axial movement of the metal rod (24). After the displacement, the piston remains immobile in that position until it receives an external stimulus. The (optional) use of a linear actuator with double-acting capability allows the filling of the lower chamber (22), returning the piston to the initial position by expelling the air trapped in the upper chamber through the exhaust ports (13) of the directional valve (4). Optionally, the installation of pneumatic filters (12) is foreseen in the exhaust ports to attenuate the sound produced by the exit of air and prevent the entry of solid impurities. A flow regulating valve (7) is connected to the outlet of the lower chamber, responsible for controlling the flow rate of exiting confined air (emptying) in the lower chamber, managing the downward displacement of the piston over time. At the top of the regulator, there is a handle (16) which, when turned, determines the size of the section of the passage hole of the pressurized air. In other words, this adjustment in the outlet flow is responsible for adjusting the speed of movement of the internal metallic rod of the linear actuator. At the end of the rod that is external to the skirt, a thread is provided, which allows the connection of a baton (6), preferably made of an insulating material such as polyamide, not being limited to this material, which during the movement of the piston will be forced to be inserted into the metallic mold, expelling the material obtained by the freeze-casting process to the receiving chamber.

Figure 3A:
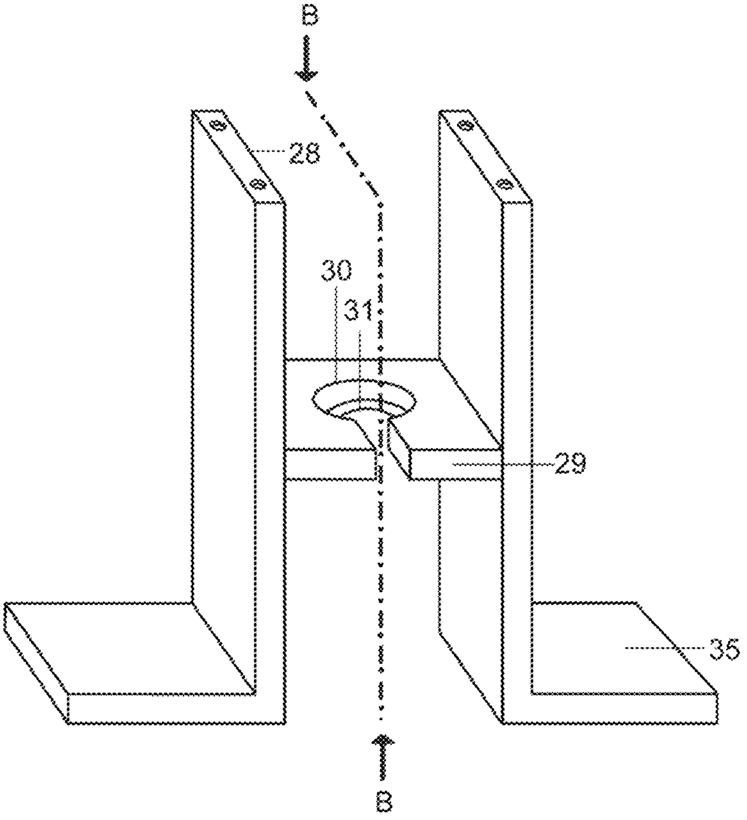
FIG. 3*a* illustrates a perspective view of the metallic support (9).
Figure 3B:
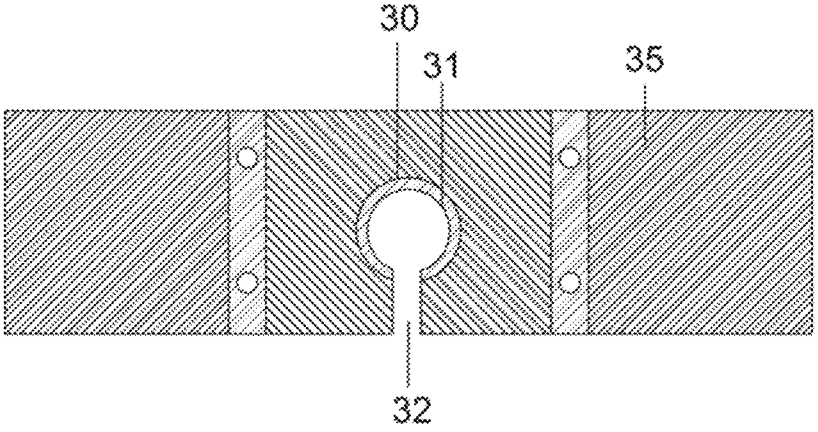
FIG. 3*b* illustrates a top view of the metallic support (9).
Figure 3C:
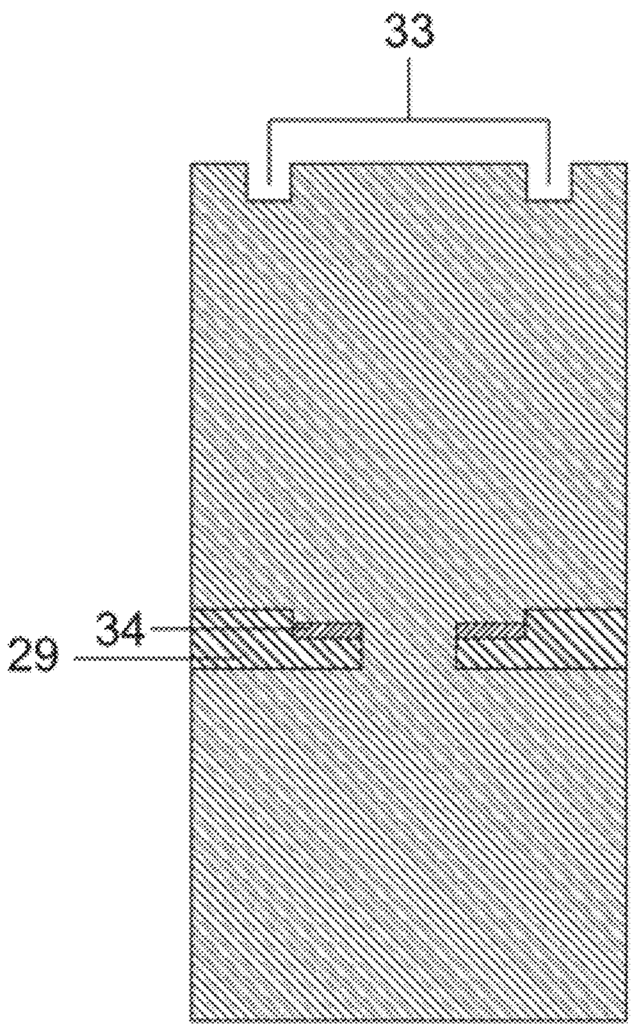
FIG. 3*c* illustrates the BB section indicated in FIG. 3*a*.
Figure 4A:
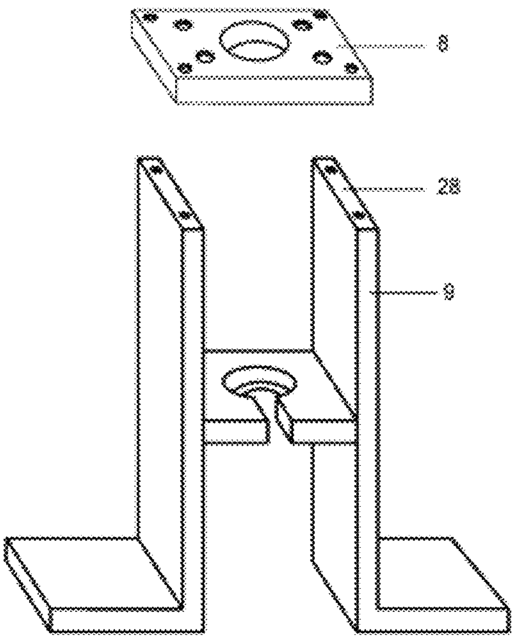
FIG. 4*a* illustrates the mounting of the fastening means (8) on the metal support (9).
Figure 4B:
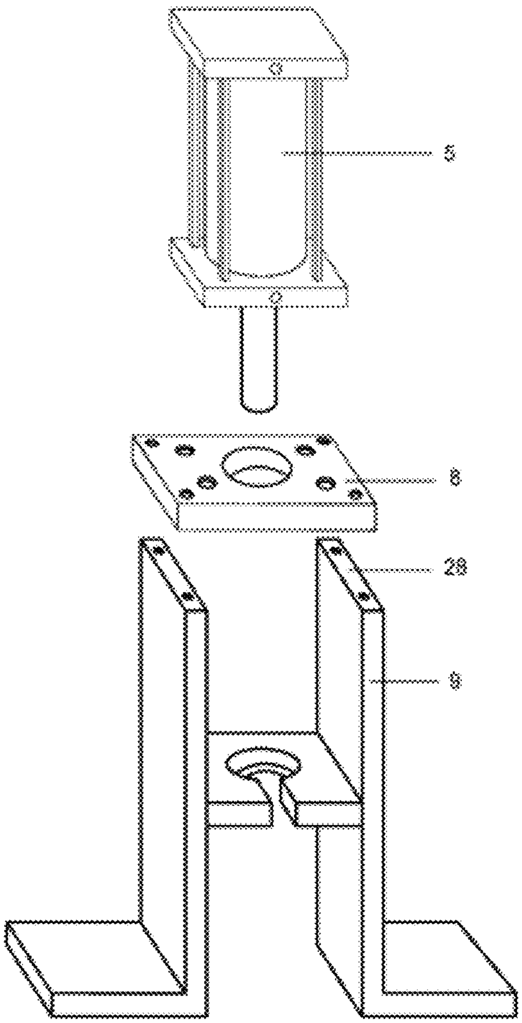
FIG. 4*b* illustrates a sequence of assembly of the linear actuator (5) in the metallic support (9) using a fastening means (8).

The support of the pneumatic linear actuator is obtained by installing it on a support (9) produced with high mechanical strength metallic material, preferably in carbon steel, without being limited. The schematic drawing in FIG. 3*a* illustrates an optional design for the metal support. In FIG. 3*b* a top view of the support is shown and in FIG. 3*c* a side view as shown in section BB shown in FIG. 3*a*. The metallic support has a structure that comprises an upper base (28) for positioning the linear actuator, an intermediate platform (29) for positioning the metallic mold, a foundation (35) for stabilizing the set on a flat surface and pillars that support the apparatus. In order to conduct the fastening of the linear actuator on the upper base of the metallic support, a fastening means (8) is used, optionally a front fastening flange, compatible with the cylinder dimensioned for the application according to the assembly shown in FIG. 4*b*. Therefore, holes (33) are provided in the upper base to aid in fastening the flange by means of screws (not identified). In a similar way, the linear actuator is fastened to the flange, according to the illustration shown in FIG. 4*a*. The middle platform must provide a central hole (30) for the passage of the lower part of the metallic mold. In addition, there must be an arc-shaped edge (31) that allows fastening the side flap of the mold. Similarly, there must be a frontal cut (32) that allows the mold access to the edge fitting point and consequent fastening of the mold support ring, as emphasized by FIG. 3*b*. For that, the metallic mold must have a ring perpendicular to its length that, when being driven to the positioning in the set of the intermediate base of the support, will promote its immobilization during the introduction of the demolding piston. It is worth to emphasize the importance of the juxtaposition between the side ring of the mold and the edge of the intermediate platform (29) of the support, a device constituted by a material of low thermal conductivity (34), in order to delay the transfer of heat between the metallic components, curbing the heat conduction from the metal support to the cooled mold.

Figure 5A:
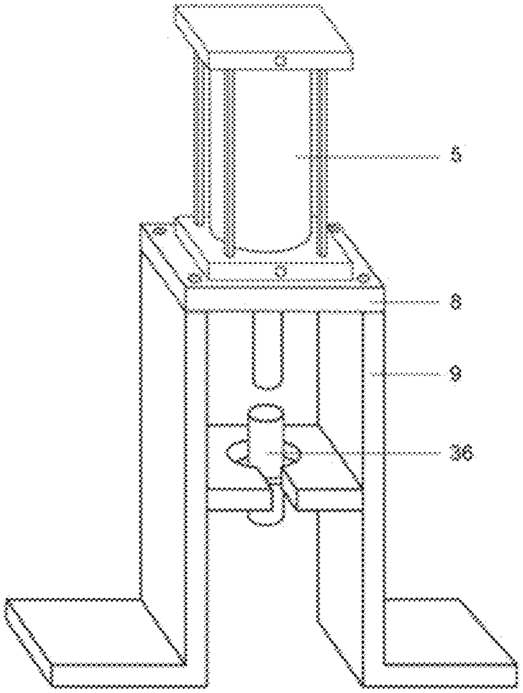
FIGS. 5*a* and 5*b* illustrate the action of removing the material (43) produced by freeze-casting from the inside of the mold (36) using the linear actuator (5).
Figure 5B:
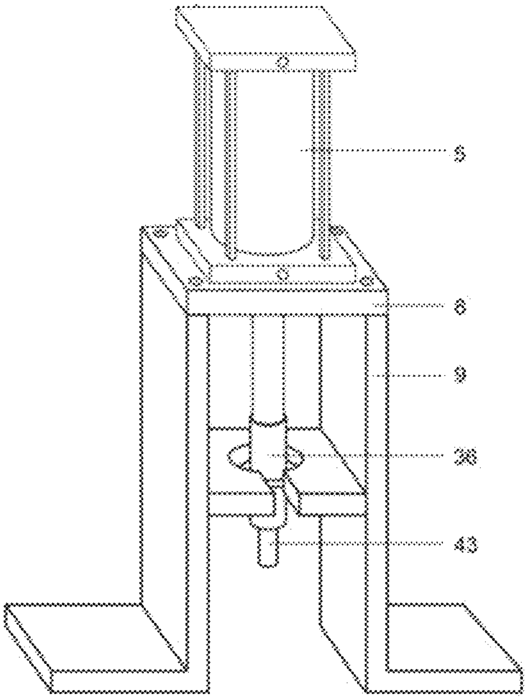
Figure 6A:
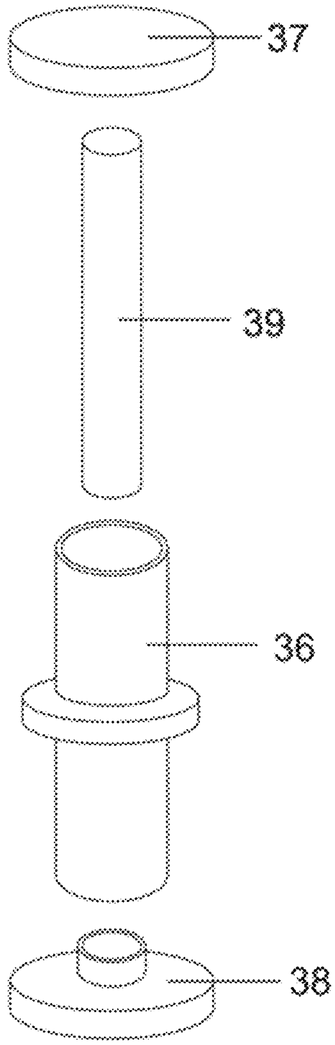
FIG. 6*a* illustrates an assembly sequence of the metallic mold assembly (36); top (37) and bottom (38) covers; insulating mold (39).
Figure 6B:
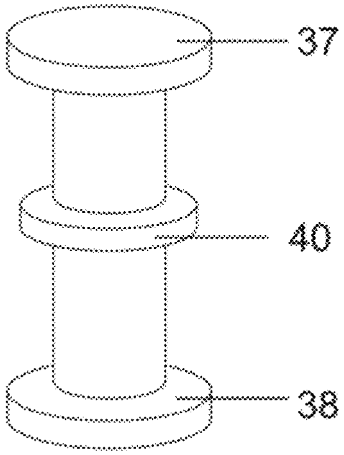
FIG. 6*b* illustrates the metallic mold set (36); top (37) and bottom (38) covers; assembled insulating mold (39).
Figure 7A:
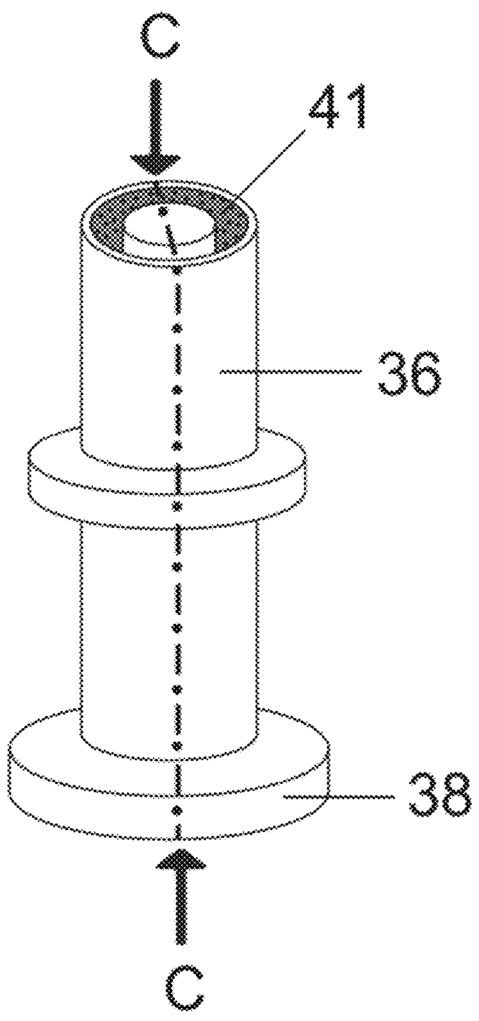
FIG. 7*a* illustrates the perspective view of the metallic mold assembly (36); bottom cover (38); insulating mold (39) after pouring the suspension (41).
Figure 7B:
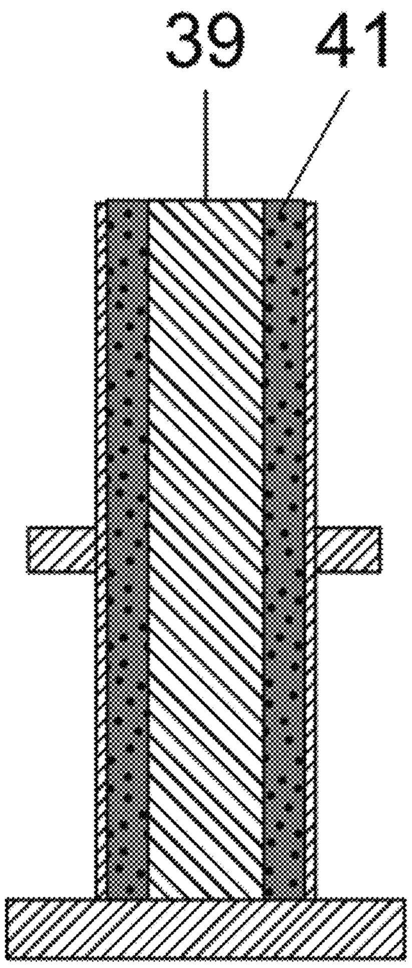
FIG. 7*b* illustrates the CC section indicated in FIG. 7*a*.

For the production of materials by means of the freeze-casting technique, an apparatus is used as described in FIG. 6. This assembly basically consists of the use of an open metallic tubular mold (36), sealed by two metallic covers, upper (37) and lower (38), and an inner tube mold (39) produced with material of low thermal conductivity. The metallic mold must be manufactured in such a way as to have an external central ring (40) that will support the metallic support. The importance of this ring lies in the fact that its function is to keep the metallic component immobile during the application of pressure by means of the baton inside, promoting the sliding of the material produced by freeze-casting, as shown in FIG. 5*b*. The internal mold is made to be a completely solid piece that will be centered inside the metallic tube with the help of the upper and lower sealing covers. After positioning the lower cover and the internal mold in the metal tube, the suspension (41) is poured into the cavity between the two elements, as shown in FIG. 7*b*. Next, the assembly is sealed with the top metal cover. The artifact is immersed in a bath containing the coolant. When the liquid comes into contact with the external face of the metallic tube, a rapid cooling of the molding component occurs and this loss of heat is transmitted to the suspension. However, the internal mold remains at a temperature close to room temperature. The temperature gradient allows the growth of solvent crystals in the radial direction, that is, from the external metallic mold to the insulating internal mold. This assembly is valid for obtaining materials with pore structures ordered in the geometry of hollow tubes or cylinders and discs, dispensing with the use of the polymeric baton or by means of changes in the configuration of the molding devices. At the end of cooling, the suspension (41) will have turned into a solid (42).

Figure 8A:
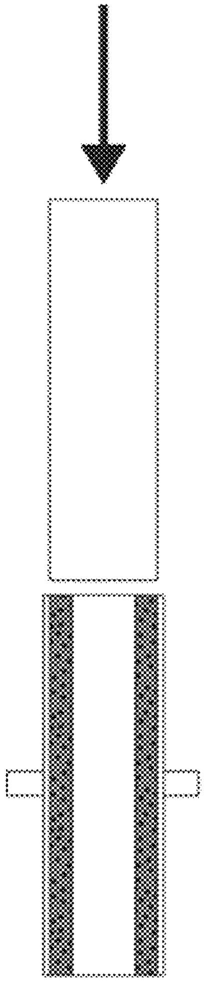
FIGS. 8*a* and 8*b* illustrate a representation of the material ejection scheme (36) obtained by freeze-casting.
Figure 8B:
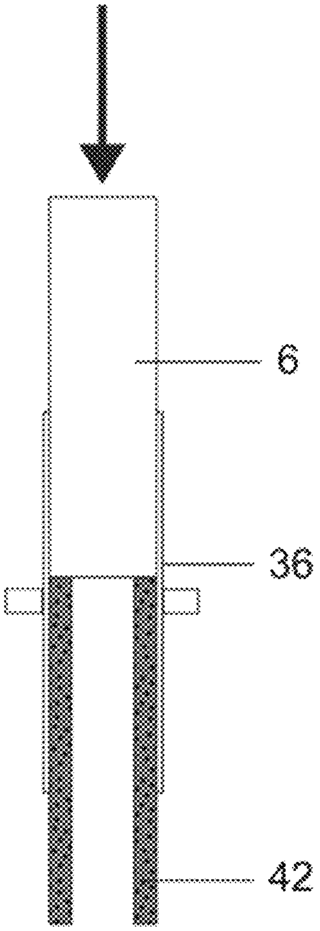

To conduct the demolding, firstly, the upper (37) and lower (38) metal mold covers must be removed, as well as the internal polymeric baton (39). Next, the metallic mold together with the frozen sample is positioned on the intermediate platform (29) of the metallic support, as can be seen in FIG. 5*a*. The polymeric baton, under the action of the linear actuator, is introduced inside the mold and comes into contact with the upper face of the material, as shown in FIG. 8*a*. The baton continues to exert a force directed downwards and promotes the sliding of the part as it advances inside the mold, as shown in FIG. 8*b*. The advance speed of the baton must be efficient to the point of not allowing the heating of the metallic assembly and/or cooled solid, thus guaranteeing that the produced material will not be damaged. The device mechanism must also act in order to avoid structural damage that could occur by strong impacts after its complete expulsion from the mold. After ejection, the porous material produced is directly directed to a temperature-controlled receiving chamber to receive the material and maintain its structural integrity.

The linear actuator used in this assembly is pneumatic in nature, not being limited to this operating principle, being admitted, for example, the use of mechanical, hydraulic or electromechanical devices. The genre must be determined according to the application for which it is intended for and, thus, the necessary adjustments must be made to adapt to the system. The linear actuator can be of double acting or single acting type.

The entire linear actuator system is surrounded by a skirt, which can be made of anodized aluminum or any other material, provided that it protects the operating system in general, such as against impacts, corrosion, impurities between others.

The tubes that make up the compressed air circulation circuit from the compressor to the pneumatic actuator must have sufficient flexibility and mechanical strength characteristics for the intended application. These hoses can be optionally manufactured from materials such as polyurethane, polyamide or others.

The pneumatic directional valve is not limited to the 5/2-way model, and can be replaced by any other that guarantees the function of commanding the start, stop, adjustment and change of the direction of the compressed air according to the needs of each application.

The metallic support must be made up of a material of high mechanical strength and chemical resistance, and carbon steel, stainless steel, brass or similar can be used.

The proposed device enables the demolding of materials in different formats such as: discs, cylinders, billets, bars or hollow tubes in different dimensions. Other formats can be used unless adjustments are made in the design of the general system, including the metal support, the ejection baton and others.

The ejection baton must preferably be made of an insulating material, for example polyamide, which sufficiently delays the heat transfer to the material produced to avoid damage to the pore structure.

Between the side ring of the mold and the edge of the intermediate platform (29) of the support, a device can be positioned, optionally a ring, consisting of a material of low thermal conductivity, for example, rubber, in order to delay the transfer of heat between the metal components, curbing heat conduction from the metal support to the cooled mold.

The invention claimed is:

1. A system for demolding materials obtained by freeze-casting the system comprising:

- a source of compressed air;
- a pressure regulator filter fluidically coupled to the source of compressed air;
- a manometer coupled to the pressure regulator filter;
- a directional valve fluidically coupled to the source of compressed air by the regulator filter, the directional valve configured to direct compressed air to an end user;
- a linear actuator fluidically coupled to the directional valve, the directional valve configured to control the linear actuator;

a baton coupled to and arranged to be axially moved by the linear actuator;

a flow regulating valve fluidically coupled to the linear actuator, the flow regulator valve configured to regulate an actuation speed of the linear actuator;

a fastening means coupled to the linear actuator;

a mold assembly comprising an outer mold and an inner mold disposed within the outer mold, wherein the outer mold is configured to freeze a material disposed between the inner mold and the outer mold while the inner mold remains at a temperature that is about room temperature, the outer mold and the inner mold configured to define a temperature gradient allowing freezing in a radial direction from the outer mold to the inner mold;

a metallic support arranged to support the fastening means, the metallic support comprising an intermediate platform configured to position the mold assembly after the material has been frozen within the mold assembly; and a chamber arranged to receive the frozen material from the mold.

2. The system according to claim 1, wherein, after an outlet of the source of compressed air, compressed air is carried through air transmission lines comprising resistant, elastic material.

3. The system of claim 1, wherein the flow regulating valve is coupled to an outlet of a lower chamber of the linear actuator.

4. The system of claim 3, wherein the flow regulating valve controls a flow rate of pressurized air from the lower chamber of the linear actuator, controlling a displacement speed of the baton and the frozen material slipping out of the mold.

5. The system of claim 3, wherein the linear actuator comprises a front head, a rear head, and four tie rods supporting the front head and the rear head.

6. The system of claim 5, wherein the front head and the rear head each define holes configured to receive a hose to carry compressed air and access to an upper and the lower chambers.

7. The system of claim 1, further comprising a seal comprising a set of sealing rings positioned on a piston coupled to and aligned with the baton.

8. The system of claim 7, wherein the piston is surrounded by a skirt of anodized aluminum.

9. The system of claim 1, wherein compressed air is routed to the pressure regulator filter coupled with the manometer.

10. The system of claim 1, wherein the pressure regulating filter comprises a valve that opens and closes to regulate the source of compressed air.

11. The system of claim 1, wherein the directional valve is a 5/2-way type, having one port for inlet, two ports for exhaust, and two ports for work.

12. The system of claim 1, further comprising an actuator configured to advance or withdrawal of the baton, the actuator being installed in the directional valve.

13. The system of claim 1, in exhaust ports, pneumatic filters to attenuate sound produced by an exit of the compressed air and to prevent an entry of solid impurities.

14. The system of claim 1, wherein the compressed air is conducted to the linear actuator, which is fastened to the metallic support by a fastening means.

15. The system of claim 1, characterized in that the metallic support comprises carbon steel.

16. The system of claim 1, wherein the support comprises:

an upper base configured to position the linear actuator; and a foundation configured to stabilize the system on a flat surface and support pillars.

17. The system of claim 16, wherein the upper base of the support defines holes configured to support the fastening means.

18. The system of claim 1, wherein the baton, configured to eject the frozen material, is coupled to a metallic rod of the linear actuator, and both the baton and the metallic rod are configured to move in a linear direction.

19. The system of claim 1, the baton comprises a thermal insulating material.

20. The system of claim 16, wherein the system comprises a front fastening flange configure to fasten the linear actuator on the upper base of the metallic support with holes on the upper base to aid the fastening by screws.

21. The system of claim 1, wherein the intermediate platform defines a central hole configured to receive a lower part of the mold.

22. The system of claim 1, wherein the intermediate platform defines an edge in an arc shape configured to fasten a side flap of the mold, the intermediate platform further defining a frontal cut configured to allow access to the mold to a fitting point of the edge, for fastening a mold support ring.

23. The system of claim 22, wherein a juxtaposition between the support ring of the mold and the edge of the intermediate platform is configured to delay a transfer of heat between the mold and the intermediate platform.

24. The system of claim 22, wherein a ring comprising thermal insulating material is positioned on the edge of the intermediate platform.

25. The system of claim 1, wherein, after ejection, the frozen material is conducted to the chamber with controlled temperature to receive a cooled material.

26. The system of claim 16, wherein the mold remains immobilized on the intermediate platform, while the linear actuator exerts pressure inside the mold by the baton.

27. The system of claim 15, wherein the metallic support comprises carbon steel.

28. The system of claim 19, wherein the thermal insulating material comprises polyamide or acrylic.

29. The system of claim 24, wherein the ring of thermal insulating material comprises rubber.

30. The system of claim 2, wherein the resistant, elastic material comprises polyurethane, polyamide, or polyethylene.

31. The system of claim 1, wherein the pressure regulator filter and the manometer are fluidically between the source of compressed air and the directional valve.

32. The system of claim 31, wherein the manometer is fluidically between the pressure regulator filter and the directional valve.

* * * * *